US009820100B1

United States Patent
Jarvis et al.

(10) Patent No.: US 9,820,100 B1
(45) Date of Patent: Nov. 14, 2017

(54) MULTI-SOURCE POSITIONING

(71) Applicant: QUALCOMM Incorporated, San Diego, CA (US)

(72) Inventors: Murray Jarvis, Cambridge (GB); Simon Gibbs, Bury St. Edmunds (GB); Benjamin Tarlow, Cottenham (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/185,343

(22) Filed: Jun. 17, 2016

(51) Int. Cl.
- *H04W 24/00* (2009.01)
- *H04W 4/02* (2009.01)
- *H04W 4/04* (2009.01)
- *G01S 5/02* (2010.01)

(52) U.S. Cl.
CPC ........... *H04W 4/025* (2013.01); *G01S 5/0263* (2013.01); *H04W 4/028* (2013.01); *H04W 4/04* (2013.01)

(58) Field of Classification Search
USPC ...................................................... 455/456.1
See application file for complete search history.

(56) References Cited

U.S. PATENT DOCUMENTS

| | | | |
|---|---|---|---|
| 8,626,443 B2 | 1/2014 | Robertson et al. | |
| 8,879,426 B1 | 11/2014 | Quilling et al. | |
| 8,994,590 B2 | 3/2015 | Jarvis et al. | |
| 2007/0027612 A1* | 2/2007 | Barfoot | G05D 1/0297 701/117 |
| 2007/0247366 A1 | 10/2007 | Smith et al. | |
| 2007/0270153 A1 | 11/2007 | Lanzo et al. | |
| 2011/0117924 A1 | 5/2011 | Brunner et al. | |
| 2013/0245933 A1 | 9/2013 | Castaneda | |
| 2013/0331121 A1 | 12/2013 | Bandyopadhyay et al. | |
| 2014/0278054 A1 | 9/2014 | Tidd et al. | |
| 2015/0031390 A1 | 1/2015 | Robertson et al. | |
| 2015/0237595 A1 | 8/2015 | Le | |
| 2016/0033265 A1 | 2/2016 | Le | |
| 2016/0202341 A1 | 7/2016 | Burgess et al. | |

OTHER PUBLICATIONS

Arulampalam, M. S., Maskell, S., Gordon, N., & Clapp, T. (Feb. 2002). A tutorial on particle filters for online nonlinear/non-Gaussian Bayesian tracking. IEEE Transactions on Signal Processing, 50(2), 174-188.
International Search Report and Written Opinion—PCT/US2017/018112—ISA/EPO—Jun. 27, 2017.

* cited by examiner

*Primary Examiner* — Joel Ajayi
(74) *Attorney, Agent, or Firm* — Hunter Clark PLLC

(57) ABSTRACT

Disclosed are methods, systems, devices, apparatus, computer-/processor-readable media, and other implementations, including a method that includes obtaining, at a mobile device, remote transmitter location estimates for one or more remote transmitters, obtaining, at the mobile device, a group of pedestrian dead-reckoning (PDR) measurements, obtaining, at the mobile device, a group of signal measurements for signals received from the one or more remote transmitters, and deriving at least one mobile device location estimate for the mobile device based on one or more inconsistency terms representative of inconsistency between different location solutions, for the at least one mobile device location estimate, computed using different data points from the remote transmitter location estimates for the one or more remote transmitters, the group of PDR measurements, and the group of signal measurements.

21 Claims, 7 Drawing Sheets

MULTI-SOURCE POSITIONING

BACKGROUND

Multi-technology processes for (indoor) positioning attempt to estimate a position of a device using measurement data from multiple, independent sources, e.g., Wi-Fi, GNSS, Bluetooth® wireless technology, sensors (e.g., MEMS sensors such as accelerometers, gyroscopes, magnetometers, and so on), and assistance data relating to a local environment, e.g., access point or cell tower database, street map, a building floorplan, etc. However, error biases from different sources are often ignored. For example, successive Wi-Fi/GNSS/cellular measurement sets are treated as independent; bias in PDR heading or step length is often ignored; and each successive use of a transmitter position estimate from a database is treated as independent. That is, errors between one set of data and the next are usually treated as uncorrelated. This can lead to large errors in the final position estimate.

SUMMARY

In some variations, a method to determine location information is provided. The method includes obtaining, at a mobile device, remote transmitter location estimates for one or more remote transmitters, obtaining, at the mobile device, a group of pedestrian dead-reckoning (PDR) measurements, obtaining, at the mobile device, a group of signal measurements for signals received from the one or more remote transmitters, and deriving at least one mobile device location estimate for the mobile device based on one or more inconsistency terms representative of inconsistency between different location solutions, for the at least one mobile device location estimate, computed using different data points from the remote transmitter location estimates for the one or more remote transmitters, the group of PDR measurements, and the group of signal measurements.

Embodiments of the method may include at least some of the features described in the present disclosure, including one or more of the following features.

Obtaining the remote transmitter location estimates for the one or more remote transmitters may further include obtaining, at the mobile device, uncertainties associated with the remote transmitter location estimates.

Deriving the at least one mobile device location estimate may include deriving a cost function including variable constraint terms representative of the one or more inconsistency terms, and minimizing the cost function to determine the at least one mobile device location estimate that minimizes the inconsistency between the different location solutions, for the at least one mobile device location estimate, computed using the different data points from the remote transmitter location estimates, the group of PDR measurements, and the group of signal measurements.

The at least one mobile device location estimate may include multiple mobile device location estimates for the mobile device at different time instances, and deriving the cost function may include determining the cost function based on one or more of, for example, a first cost contribution computed based on first inconsistency terms between a first group of the multiple mobile device location estimates and position fixes for the mobile device, a second cost contribution of second inconsistency terms between a second group of the multiple mobile device location estimates and the remote transmitter location estimates, a third cost contribution of third inconsistency terms between a third group of the multiple mobile device location estimates and updated remote transmitter location estimates of the one or more remote transmitters, a fourth cost contribution of fourth inconsistency terms between a fourth group of the multiple mobile device location estimates and one or more PDR trajectories computed at least in part based on the group of PDR measurements, and/or a fifth cost contribution of fifth inconsistency terms between the updated remote transmitter location estimates and the remote transmitter location estimates.

One or more of the position fixes for the mobile device may be determined based, at least in part, on at least some of the group of signal measurements. The group of signal measurements may include one or more of, for example, satellite signals, and/or wireless signals from terrestrial nodes.

Minimizing the cost function may include generating a sum of squared terms of one or more of, for example, the first inconsistency terms, the second inconsistency terms, the third inconsistency terms, the fourth inconsistency terms, and/or the fifth inconsistency terms, and weighting one or more of the squared terms of the sum according to respective uncertainties associated with one or more of, for example, the first inconsistency terms, the second inconsistency terms, the third inconsistency terms, the fourth inconsistency terms, and/or the fifth inconsistency terms.

The fourth cost contribution of the fourth inconsistency terms between the fourth group of the multiple mobile device location estimates and the one or more PDR trajectories computed at least in part based on the group of PDR measurements may include cost variable constraint terms representative of PDR trajectory variations. The PDR trajectory variations may include one or more of, for example, a rotation operation applied to a PDR trajectory derived based on the group of PDR measurements, and/or a stretching operation applied to the PDR trajectory.

The method may further include determining the second cost contribution of the second inconsistency terms between the second group of the multiple mobile device location estimates and the remote transmitter location estimates based, at least in part, on the group of signal measurements. Determining the second cost contribution may include mapping respective signals in the group of signal measurements to corresponding ones of the second group of the multiple mobile device location estimates and to corresponding ones of the remote transmitter location estimates.

The method may further include applying weights to respective terms of one or more of, for example, the first cost contribution, the second cost contribution, the third cost contribution, the fourth cost contribution, and/or the fifth cost contribution, such that one group of terms, from the respective terms, corresponding to a more recent set of measurements used to determine the one group of terms is weighted more heavily than another group of terms, from the respective terms, corresponding to an earlier set of measurements used to determine the other group of terms.

Obtaining the group of PDR measurements may include obtaining measurements from one or more inertial sensors of the mobile device, with the one or more inertial sensors including one or more of, for example, a gyroscope, an accelerometer, and/or a magnetometer.

Obtaining the remote transmitter location estimates may include obtaining the remote transmitter location estimates from received assistance data including one or more of, for example, floorplan data, street map data, global frame data, and/or local frame data.

The group of PDR measurements and the group of signal measurements for the signals received from the one or more remote transmitters may correspond to multiple measurements at different time instances during a time interval, and the at least one mobile device location estimate may include multiple mobile device location estimates corresponding to at least some of the different time instances during the time interval.

In some variations, a mobile wireless device is provided that includes one or more inertial sensors configured to obtain a group of pedestrian dead-reckoning (PDR) measurements, and a transceiver configured to obtain remote transmitter location estimates for one or more remote transmitters and to obtain a group of signal measurements for signals received from the one or more remote transmitters. The mobile wireless device further includes one or more processors, coupled to the transceiver and the one or more inertial sensors, configured to derive at least one mobile device location estimate for the mobile wireless device based on one or more inconsistency terms representative of inconsistency between different location solutions, for the at least one mobile device location estimate, computed using different data points from the remote transmitter location estimates for the one or more remote transmitters, the group of PDR measurements, and the group of signal measurements.

In some variations, an apparatus to determine location information is provided. The apparatus includes means for obtaining, at a mobile device, remote transmitter location estimates for one or more remote transmitters, means for obtaining, at the mobile device, a group of pedestrian dead-reckoning (PDR) measurements, means for obtaining, at the mobile device, a group of signal measurements for signals received from the one or more remote transmitters, and means for deriving at least one mobile device location estimate for the mobile device based on one or more inconsistency terms representative of inconsistency between different location solutions, for the at least one mobile device location estimate, computed using different data points from the remote transmitter location estimates for the one or more remote transmitters, the group of PDR measurements, and the group of signal measurements.

In some variations, a non-transitory computer readable media is provided, that is programmed with instructions, executable on a processor, to obtain, at a mobile device, remote transmitter location estimates for one or more remote transmitters, obtain, at the mobile device, a group of pedestrian dead-reckoning (PDR) measurements, obtain, at the mobile device, a group of signal measurements for signals received from the one or more remote transmitters, and derive at least one mobile device location estimate for the mobile device based on one or more inconsistency terms representative of inconsistency between different location solutions, for the at least one mobile device location estimate, computed using different data points from the remote transmitter location estimates for the one or more remote transmitters, the group of PDR measurements, and the group of signal measurements.

Embodiments of the mobile wireless device, the apparatus, and the computer readable media may include at least some of the features described in the present disclosure, including at least some of the features described above in relation to the method.

Other and further objects, features, aspects, and advantages of the present disclosure will become better understood with the following detailed description of the accompanying drawings.

BRIEF DESCRIPTION OF THE DRAWINGS

Like reference symbols in the various drawings indicate like elements.

DETAILED DESCRIPTION

Figure 1:
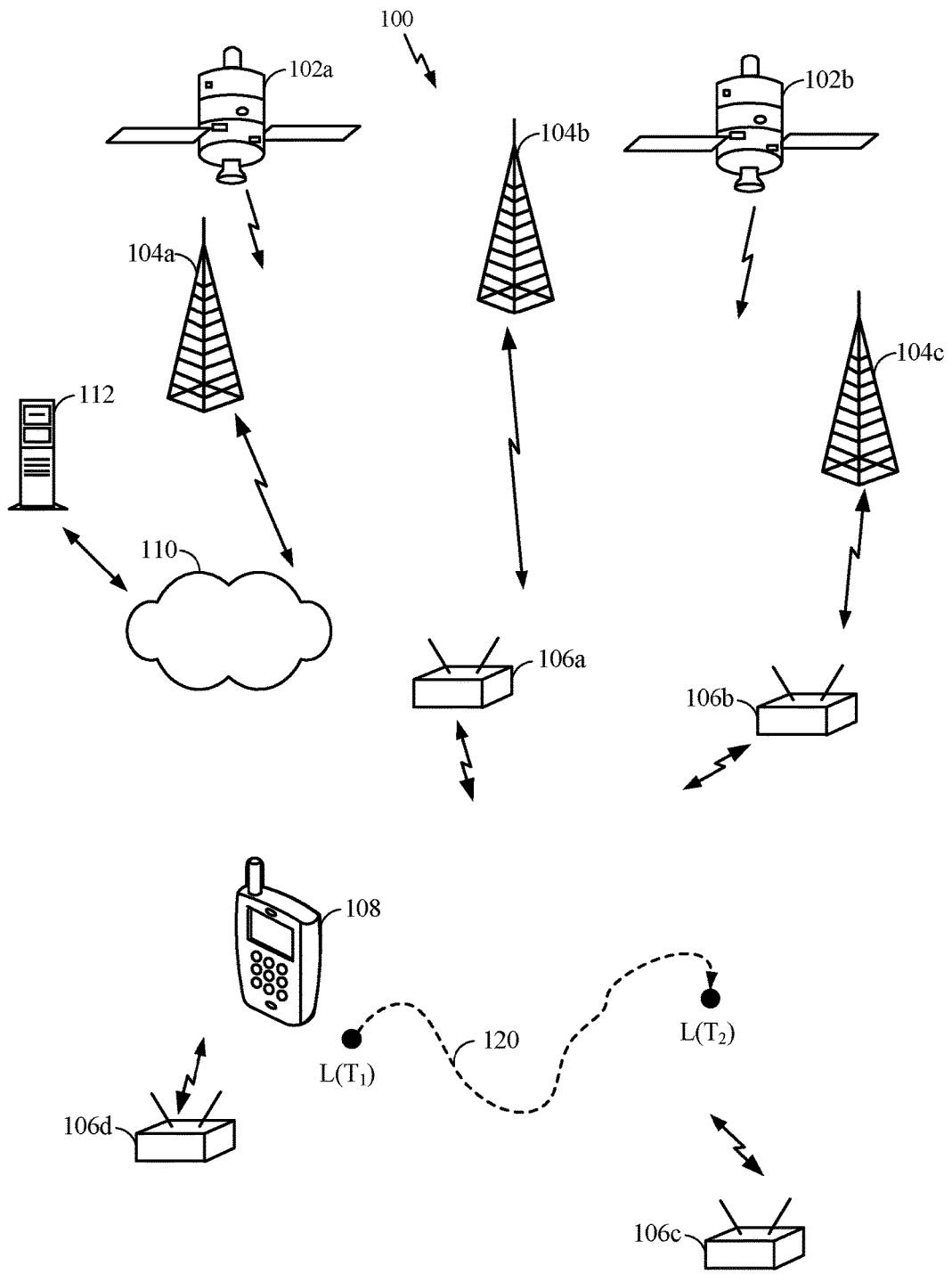
FIG. 1 is a diagram of an example operating environment that includes a wireless mobile device configured to facilitate determination of location information.

Described herein are methods, systems, devices, apparatus, computer-/processor-readable media, and other implementations to determine location information (for a mobile device and/or for remote devices), including a method that includes obtaining, at the mobile device, transmitter location estimates for one or more remote transmitters, obtaining, at the mobile device, a group of pedestrian dead-reckoning (PDR) measurements (e.g., obtained via measurements from inertial sensors of the mobile device, such as an accelerometer, a gyroscope, a magnetometer, etc.), and obtaining, at the mobile device, a group of signal measurements (e.g., signal strength or timing-based measurements) for signals received from one or more remote transmitters (e.g., WiFi transmitters, cellular base stations, satellite transmitter, and/or other types of nodes). The method also includes deriving at least one mobile device location estimate for the mobile device based on one or more inconsistency terms representative of inconsistency between different location solutions, for the at least one mobile device location estimate, computed using different data points from the remote transmitter location estimates for one or more remote transmitters, the group of PDR measurements, and the group of signal measurements. The group of PDR measurements and the group of signal measurements for the signals received from the one or more remote transmitters may correspond to multiple measurements at different time instances during a time interval, and the at least one mobile device location estimate may include multiple mobile device location estimates corresponding to at least some of the different time instances during the time interval. In some embodiments, deriving the at least one mobile device location estimate may include deriving a cost function including variable constraint terms representative of the inconsistency terms, and minimizing the cost function to determine the at least one mobile device location estimate that minimizes the inconsistency between the different location solutions, for the at least one mobile device location estimate, computed using the different data points from the remote transmitter location estimates, the group of PDR measurements, and the group of signal measurements (techniques, other than techniques based on cost function minimization, may also be used to resolve inconsistency between different location solutions). The at least one mobile device location estimate may include multiple mobile device location estimates for the mobile device at different time instances, and deriving the cost function may include determining the cost function based on, for example, a first cost contribution computed based on first inconsistency terms between a first group of the multiple mobile device location estimates and position fixes for the mobile device, a second cost contribution of second inconsistency terms between a second group of the multiple mobile device location estimates and the remote transmitter location estimates, a third cost contribution of third inconsistency terms between a third group of the multiple mobile device location estimates and updated remote transmitter location estimates of the one or more remote transmitters, a fourth cost contribution of fourth inconsistency terms between a fourth group of the multiple mobile device location estimates and one or more PDR trajectories computed at least in part based on the group of PDR measurements, and/or or a fifth cost contribution of fifth inconsistency terms between the updated remote transmitter location estimates and the remote transmitter location estimates.

PDR measurements (based on which relative location information may be derived) may be performed by sensors that include, for example, accelerometers, gyroscopes, magnetometers, barometers, etc., and that allow the mobile device to monitor changes in its location and, by combining these changes with a previously calculated location, to calculate a current location. However, location systems based on PDR sensors tend to lose accuracy over longer terms of use due to the inherent uncertainty of the sensors or due to sensor drift, thus resulting in inaccurate location information. The implementations described herein facilitate determination of location solutions which may have been taken over a period of time (e.g., location estimates for remote nodes/devices) based on local measurements that include not only sensor measurements but also wireless/RF measurements. The location solutions are obtained locally at a mobile device, without needing to obtain or provide measurements to and from other devices (e.g., to facilitate a global location determination solution through, for example, crowd-sourcing operations). However, in some embodiments, some of the operations described herein may be performed, at least in part, at a remote device (e.g., remote from the local device that obtained the various measurements).

With reference to FIG. 1, a diagram of an example operating environment 100 that includes a wireless mobile device 108, is shown. The mobile device 108 is configured to perform operations to facilitate determination of the mobile device's location estimate based, at least in part, on wireless signal measurements from those remote transmitters (including satellite transmitter and terrestrial transmitters), which, in the example of FIG. 1, are obtained over some period/interval of time (e.g., the interval between $T_1$ and $T_2$), with those measurements defining a history of RF measurements during that interval. The mobile device's location estimate may also be based on pedestrian dead-reckoning (PDR) measurements (which, when taken over the time interval between $T_1$ and $T_2$, also define a history of PDR measurements). During the time interval, the mobile device 108 travels in a trajectory 120 between the points $L(T_1)$ and $L(T_2)$. Determination of a location estimate(s) for the mobile device may be implemented by reducing or resolving inconsistencies between different location solutions for the location estimates for the mobile device that are computed using different data points from the obtained measurements and data. For example, deriving the location estimate for the mobile device can be performed by deriving a cost function that includes variable constraint terms representative of inconsistencies (discrepancies) between the different location solutions and minimizing the cost function in order to minimize the inconsistency between the different location solutions. In some embodiments, the cost function may be derived from a maximum likelihood function (e.g., the cost function may be a log of the maximum likelihood function). An advantage of use of a cost function is that it provides a convenient and effective way of taking into account the correlation effects in the errors between one set of data and another (e.g., error correlation between wireless/RF signal measurement sets, error correlation between PDR measurement sets, error correlation between wireless/RF signal measurements and PDR measurements, etc.)

As will be discussed in greater detail below, the cost function can be constructed so that it includes contributions from different sources. For example, there are contributions to the overall cost associated with stretching and rotating any of the trajectory path segments. The cost incurred by the path history can be minimized using a numerical process(es) to give a "best fit" path. The user position estimate may come from this minimum path and its confidence can be extracted using, for example, the Hessian of the cost function at its minimum. Additionally, the cost function includes contributions from transmitters observed during the path. Another source of contribution may be based on uncertainty associated with known (i.e., pre-determined) location estimates for observed transmitters. Local transmitter position estimates and associated uncertainties/confidences may be provided to the device. Additionally, there is a cost contribution from absolute position fixes. Each absolute position fix exerts a pull on the user trajectory being evaluated. As well as rotating and stretching the individual PDR path segments, a "cheaper", global rotation and global stretching can also be solved for cost function unknowns. This reduces the effect of consistent biases appearing in the PDR errors, owing to user motion, and the difference between the user's step length and the stride model's assumed step length. Error biases in the absolute position fixes (from, e.g., Wi-Fi or GNSS signals) are also easier to ameliorate using a cost function compared with a positioning filter that absorbs measurements sequentially and updates an estimate of the current state. This is because the contributions from, e.g., a specific Wi-Fi access points over a period of time, can be down-weighted post hoc, so that a consistent error bias from the same transmitter/technology need not be incorporated multiple times into a solution.

The wireless device 108 may be configured to communicate according to one or more communication protocols (e.g., near-field protocols, such as Bluetooth® wireless technology or ZigBee WLAN protocols, such as a WiFi protocol according to IEEE 802.11k standard, WWAN protocols, etc.) The mobile device 108 (as well as any other device depicted in FIG. 1) may be configured to operate and interact with multiple types of other communication systems/devices, including local area network devices (or nodes), such as WLAN for indoor communication, femtocells, Bluetooth® wireless technology-based transceivers, and other types of indoor communication network nodes, wide area wireless network nodes, satellite communication systems, other mobile devices, etc. As such, the mobile device 108 may include one or more interfaces and/or transceivers to communicate with the various types of communications systems. The various devices of FIG. 1 may be configured to establish and operate according to any number of communication protocols.

As noted, the environment 100 may contain one or more different types of wireless communication systems or nodes, each of which may be used to establish communication links with the device 108. The nodes illustrated in FIG. 1 include wireless access points (or WAPs) and may include LAN and/or WAN wireless transceivers, including, for example, WiFi base stations, femto cell transceivers, Bluetooth® wireless technology transceivers, cellular base stations, WiMax transceivers, etc. Thus, for example, and with continued reference to FIG. 1, the environment 100 may include the Local Area Network Wireless Access Points (LAN-WAPs) 106*a-d* that may be used for wireless voice and/or data communication with the mobile device 108. The LAN-WAPs 106*a-d* may also be utilized, in some embodiments, as independent sources of position data, e.g., through fingerprinting-based procedures, through implementation of multilateration-based procedures based, for example, on timing-based techniques (e.g., observed-time-difference-of-arrival (or OTDOA), RTT-based measurements, etc.), signal strength measurements (e.g., RSSI measurements), etc. The LAN-WAPs 106*a-d* can be part of a Wireless Local Area Network (WLAN), which may operate in buildings and perform communications over smaller geographic regions than a WWAN. Additionally in some embodiments, the LAN-WAPs 106*a-d* could also include pico or femto cells. In some embodiments, the LAN-WAPs 106*a-d* may be part of, for example, WiFi networks (802.11x), cellular piconets and/or femtocells, Bluetooth® wireless technology Networks, etc. Although four (4) LAN-WAP's are depicted in FIG. 1, any number of such LAN-WAP's may be used, and, in some embodiments, the environment 100 may include no LAN-WAPs at all, or may include a single LAN-WAP. As noted, the various LAN-WAP's may be associated with location estimates that may have corresponding location uncertainties, and thus, in embodiments described herein, more accurate location estimate solution may be derived.

As further illustrated, the environment 100 may also include a plurality of one or more types of the Wide Area Network Wireless Access Points (WAN-WAPs) 104*a-c*, which may be used for wireless voice and/or data communication, and may also serve as another source of independent information through which the mobile wireless device 108 (and/or other devices) may determine its position/location. The WAN-WAPs 104*a-c* may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104*a-c* within the WWAN may operate from fixed positions or may be moveable, and may provide network coverage over large metropolitan and/or regional areas. Although three (3) WAN-WAPs are depicted in FIG. 1, any number of such WAN-WAPs may be used. In some embodiments, the environment 100 may include no WAN-WAPs at all, or may include a single WAN-WAP. As noted, the WAN-WAPs 104*a-c* may also be associated with location uncertainties, and the mobile device 108 may thus be configured to derive a location solution that provides updated (e.g., improved or more accurate) location estimates for those nodes.

Communication to and from the mobile device 108 (to exchange data, and facilitate location determination operations and other services to the device 108, etc.) may be implemented using various wireless communication networks and/or technologies and/or encodings, such as a wide area wireless network (WWAN), a wireless local area network (WLAN), a wireless personal area network (WPAN), a peer-to-peer network, and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. In some embodiments, 4G networks, Long Term Evolution ("LTE") networks, Advanced LTE networks, Ultra Mobile Broadband (UMB) networks, and all other types of cellular communications networks may also be implemented and used with the systems, devices methods, and other implementations described herein. A WLAN may also be implemented, at least in part, using an IEEE 802.11x network, and a WPAN may be a Bluetooth® wireless technology network, an IEEE 802.15x, or some other type of network. The techniques described herein may also be used for any combination of WWAN, WLAN and/or WPAN.

In some embodiments, and as further depicted in FIG. 1, the mobile device 108 may also be configured to at least receive information from a Satellite Positioning System (SPS) 102*a-b*, which may be used as an independent source of position information for the mobile device 108. Location solution the mobile device is configured to derive may also include updated location estimates for satellite vehicles such as the vehicles 102*a-b*. The mobile device 108 may thus include one or more dedicated SPS receivers configured to receive signals for deriving device geo-location information from the SPS satellites. In embodiments in which the mobile device 108 can receive satellite signals, the mobile device may utilize a receiver (e.g., a GNSS receiver) specifically implemented for use with the SPS to extract position data from a plurality of signals transmitted by at least the SPS satellites 102*a-b*. Transmitted satellite signals may include, for example, signals marked with a repeating pseudo-random noise (PN) code of a set number of chips and may be located on ground based control stations, user equipment and/or space vehicles. The techniques provided herein may be applied to, or otherwise implemented, for use in various other systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with, or otherwise provided, for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

As further shown in FIG. 1, the system 100 may also include a server 110 (e.g., a location server, such as an E-SMLC server, or any other type of server) configured to communicate, via a network 112 (e.g., a cellular wireless network, a WiFi network, a packet-based private or public network, such as the public Internet), or via wireless transceivers included with the server 110, with multiple network elements or nodes, and/or mobile wireless devices. For example, the server 110 may be configured to establish communication links with one or more of the WLAN nodes, such as the access points 106a-d, which may be part of the network 112, to communicate data and/or control signals to those access points, and receive data and/or control signals from the access points. Each of the access points 106a-d can, in turn, establish communication links with mobile devices located within range of the respective access points 106a-d. The server 110 may also be configured to establish communication links (directly via a wireless transceiver(s), or indirectly, via a network connection) with one or more of the WWAN nodes, such as the WWAN access points 104a-c depicted in FIG. 1, which may also be part of the network 112, and/or to establish communication links with mobile wireless devices (such as the device 108), the light devices 120a-b, etc. The server 110 may also be configured to at least receive information from satellite vehicles 102a and/or 102b of a Satellite Positioning System (SPS), which may be used as an independent source of position information. In some embodiments, the server 110 may be part of, attached to, or reachable from network 112, and may communicate with the mobile wireless device 108, or with any other device or node depicted in FIG. 1. In some embodiments, the server 110 may be configured to perform, at least in part, some of the operations of the procedures described herein to determine location information.

Figure 2:
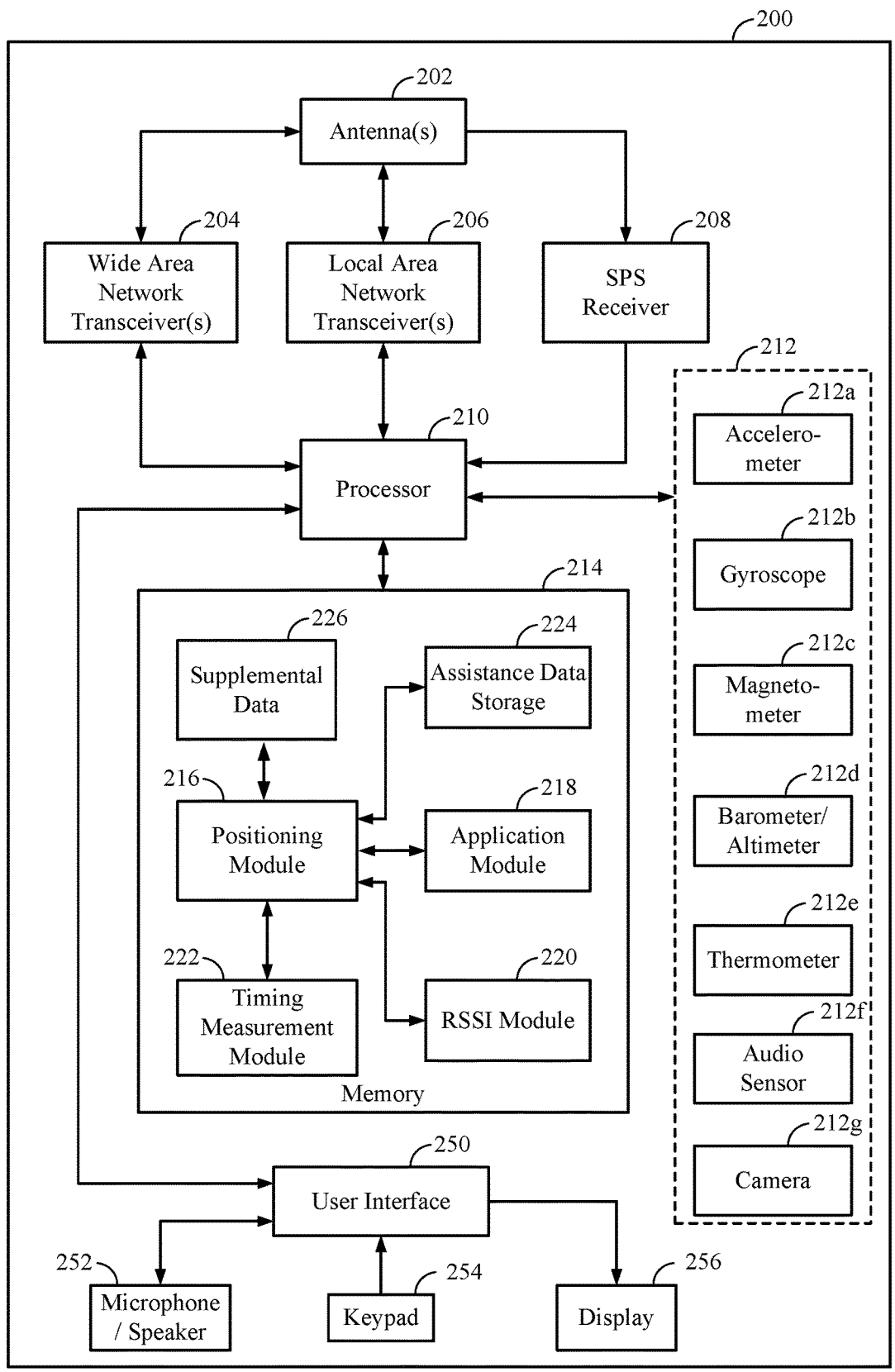
FIG. 2 is a schematic diagram illustrating various components of an example wireless mobile device.

With reference now to FIG. 2, a schematic diagram illustrating various components of an example wireless device 200 (e.g., a mobile device), which may be similar to or the same as the wireless devices 108 depicted in FIG. 1, is shown. For the sake of simplicity, the various features/components/functions illustrated in the schematic boxes of FIG. 2 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 2 may be further subdivided, or two or more of the features or functions illustrated in FIG. 2 may be combined. Additionally, one or more of the features or functions illustrated in FIG. 2 may be excluded. In some embodiments, some or all of the components depicted in FIG. 2 may also be used in implementations of one or more of the wireless nodes 104a-c and/or 106a-d, as well as the server 110 illustrated in FIG. 1. In such embodiments, the components depicted in FIG. 2 may be configured to cause the operations performed by devices (wireless devices, servers, such as location servers, etc.) as described herein, e.g., to transmit or receive control and data signals, including control and data signals based on which the receiving mobile device 200 may determine location information for its position, or determine a more accurate location estimate for the nodes from which the control and data signals have been received.

As shown, the wireless device 200 may include one or more local area network transceivers 206 that may be connected to one or more antennas 202. The one or more local area network transceivers 206 comprise suitable devices, circuits, hardware, and/or software for communicating with and/or detecting signals to/from one or more of the WLAN access points 106a-d depicted in FIG. 1, and/or directly with other wireless devices (e.g., mobile devices) within a network. In some embodiments, the local area network transceiver(s) 206 may comprise a WiFi (802.11x) communication transceiver suitable for communicating with one or more wireless access points; however, in some embodiments, the local area network transceiver(s) 206 may be configured to communicate with other types of local area networks, personal area networks (e.g., Bluetooth® wireless technology networks), etc. Additionally, any other type of wireless networking technologies may be used, for example, Ultra Wide Band, ZigBee, wireless USB, etc.

The wireless device 200 may also include, in some implementations, one or more wide area network transceiver(s) 204 that may be connected to the one or more antennas 202. The wide area network transceiver 204 may comprise suitable devices, circuits, hardware, and/or software for communicating with and/or detecting signals from one or more of, for example, the WWAN nodes 104a-c illustrated in FIG. 1 and/or directly with other wireless devices within a network. In some implementations, the wide area network transceiver(s) 204 may comprise a CDMA communication system suitable for communicating with a CDMA network of wireless base stations. In some implementations, the wireless communication system may comprise other types of cellular telephony networks, such as, for example, TDMA, GSM, WCDMA, LTE, etc. Additionally, any other type of wireless networking technologies may be used, including, for example, WiMax (802.16), etc.

In some embodiments, an SPS receiver (also referred to as a global navigation satellite system (GNSS) receiver) 208 may also be included with the wireless device 200. The SPS receiver 208 may be connected to the one or more antennas 202 for receiving satellite signals. The SPS receiver 208 may comprise any suitable hardware and/or software for receiving and processing SPS signals. The SPS receiver 208 may request information as appropriate from the other systems, and may perform the computations necessary to determine the position of the mobile device 200 using, in part, measurements obtained by any suitable SPS procedure. Additionally, measurement values for received satellite signals may be communicated to a location server configured to facilitate location determination.

As further illustrated in FIG. 2, the example wireless device 200 includes one or more sensors 212 coupled to a processor/controller 210. For example, the sensors 212 may include motion sensors to provide relative movement and/or orientation information (which is independent of motion data derived from signals received by the wide area network transceiver(s) 204, the local area network transceiver(s) 206, and/or the SPS receiver 208) based on which pedestrian dead-reckoning computations may be performed (e.g., to monitor changes in the location of the mobile device and combine those changes with a previously calculated location to derive a current location estimate). By way of example but not limitation, the motion (also referred to as inertial or orientation) sensors may include an accelerometer 212a, a gyroscope 212b, and a geomagnetic (magnetometer) sensor 212c (e.g., a compass), any of which may be implemented based on micro-electro-mechanical-system (MEMS), or based on some other technology. The one or more sensors 212 may further include an altimeter (e.g., a barometric pressure altimeter) 212d, a thermometer (e.g., a thermistor) 212e, an audio sensor 212f (e.g., a microphone) and/or other sensors. The output of the one or more sensors 212 may be provided as data transmitted to a remote device or server (via the transceivers 204 and/or 206, or via some network port or interface of the device 200) for storage or further processing. As further shown in FIG. 2, in some embodiments, the one or more sensors 212 may also include a camera 212g (e.g., a charge-couple device (CCD)-type camera, a CMOS-based image sensor, etc.), which may produce still or moving images (e.g., a video sequence) that may be displayed on a user interface device, such as a display or a screen, and that may be further used to determine an ambient level of illumination and/or information related to colors and existence and levels of UV and/or infra-red illumination.

The processor(s) (also referred to as a controller) 210 may be connected to the local area network transceiver(s) 206, the wide area network transceiver(s) 204, the SPS receiver 208 and the one or more sensors 212. The processor may include one or more microprocessors, microcontrollers, and/or digital signal processors that provide processing functions, as well as other calculation and control functionality. The processor 210 may be coupled to storage media (e.g., memory) 214 for storing data and software instructions for executing programmed functionality within the mobile device. The memory 214 may be on-board the processor 210 (e.g., within the same IC package), and/or the memory may be external memory to the processor and functionally coupled over a data bus. Further details regarding an example embodiment of a processor or computation system, which may be similar to the processor 210, are provided below in relation to FIG. 5.

A number of software modules and data tables may reside in memory 214 and may be utilized by the processor 210 in order to manage both communications with remote devices/nodes (such as the various nodes and/or the server 110 depicted in FIG. 1), perform positioning determination functionality, and/or perform device control functionality. As illustrated in FIG. 2, in some embodiments, the memory 214 may include a positioning module 216, an application module 218, a received signal strength indicator (RSSI) module 220, and/or a timing measurement module 222 to measure timing information (including round-trip-timing, or RTT) in relation to received signals. It is to be noted that the functionality of the modules and/or data structures may be combined, separated, and/or be structured in different ways depending upon the implementation of the mobile device 200. For example, the RSSI module 220 and/or the timing measurement module 222 may each be realized, at least partially, as a hardware-based implementation, and may thus include such devices or circuits as a dedicated antenna (e.g., a dedicated timing measurement and/or an RSSI antenna), a dedicated processing unit to process and analyze signals received and/or transmitted via the antenna(s) (e.g., to determine signal strength of received signals, determine timing information in relation to signals and/or an RTT cycle, etc.).

The application module 218 may be a process running on the processor 210 of the mobile device 200, which requests position information from the positioning module 216, or which receives positioning/location data from a remote device (e.g., a remote location server). Applications typically run within an upper layer of the software architectures, and may include indoor navigation applications, shopping applications, location aware service applications, etc. The positioning module/circuit 216 may derive the position of the wireless device 200 using information derived from various receivers and modules of the mobile device 200, e.g., based on signal strength measurements, timing measurements, and/or sensor measurements (that facilitate PDR computations). Data derived by the positioning module 216 may be used to supplement location information provided, for example, by a remote device (such as a location server) or may be used in place of location data sent by a remote device. For example, positioning module 216 may determine position of the device 200 (or positioning of some other remote device) based on measurements performed by various sensors, circuits, and/or modules of the device 200, and use those measurements in conjunction with assistance data received from a remote server (e.g., an E-SMLC server) to determine location of the device 200. As described herein, in some implementations, the positioning module 216 may be configured to derive a mobile device location estimate based on one or more inconsistency terms representative of inconsistencies (or discrepancies) between different location solutions computed using different data points from signal measurements from remote transmitters/nodes, PDR measurements, currently known location estimates for those remote transmitters/nodes, etc. For example, the mobile device location estimate may be derived by reducing the inconsistency between the different location solutions using a cost function representative of cost contributions corresponding to the various inconsistency terms. Minimization of the cost function may yield a location estimate for the mobile device at which the cost function is minimized (in some embodiments, reducing the inconsistencies between different location solutions may also yield include updated location estimates for the observed remote transmitters). The determination of a location estimate for the mobile device may be performed without needing to obtain or provide measurements to and from other devices (e.g., to facilitate a global location determination solution through, for example, crowd-sourcing operations). Alternatively, the processes described herein, including the process to derive a location estimate(s) for the mobile device, may be implemented through the application module 218.

As further illustrated, the wireless device 200 may also include assistance data storage 224, where assistance data, such as map information, data records relating to location information for various nodes (e.g., in an area where the device is currently located), heatmaps, neighbor lists, etc., is stored. The wireless device 200 may also be configured to receive and store supplemental information that includes auxiliary position and/or motion data determined from other sources (e.g., from the one or more sensors 212). Supplemental information may also include, but not be limited to, information that can be derived or based upon Bluetooth® wireless technology signals, beacons, RFID tags, and/or information derived from a map (e.g., receiving coordinates from a digital representation of a geographical map by, for example, a user interacting with a digital map). The supplemental information may be stored in the storage module 226 schematically depicted in FIG. 2.

The wireless device 200 may further include a user interface 250 providing suitable interface systems, such as a microphone/speaker 252, a keypad 254, and a display 256 that allows user interaction with the device 200. The microphone/speaker 252 (which may be the same or different from the sensor 2120 provides for voice communication services (e.g., using the wide area network transceiver(s) 204 and/or the local area network transceiver(s) 206). The keypad 254 may comprise suitable buttons for user input. The display 256 may include a suitable display, such as, for example, a backlit LCD display, and may further include a touch screen display for additional user input modes.

Figure 3:
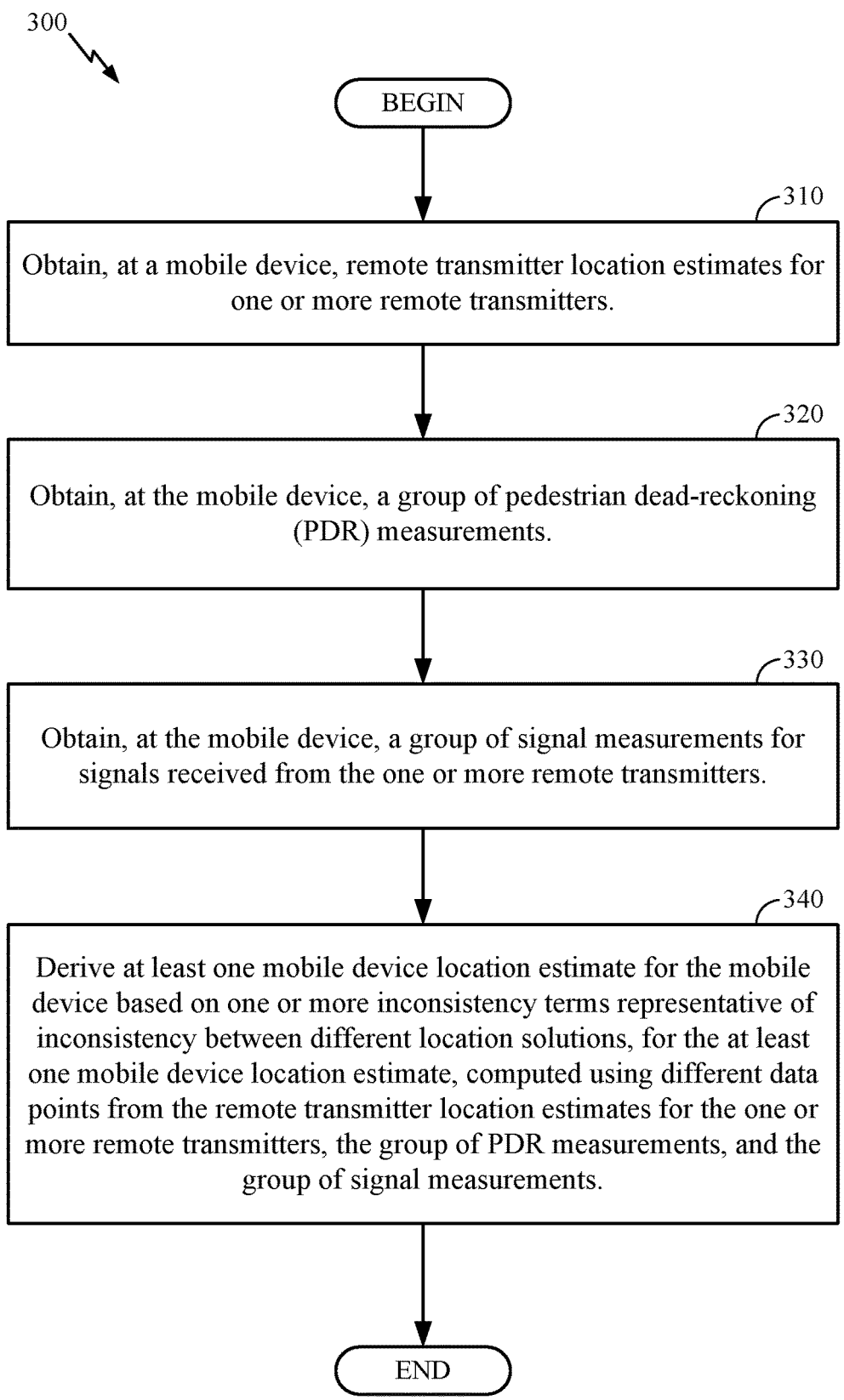
FIG. 3 is a flowchart of a procedure to determine location information.

With reference now to FIG. 3, a flowchart of an example procedure 300 to determine location information (e.g., for a mobile device, and/or for remote devices transmitting wireless signals based on which the mobile device may determine the location information) is shown. The procedure 300 may generally be performed at a mobile device, such as the mobile wireless device 108 or 200 of FIGS. 1 and 2, but at least some of the operations of the procedure 300 may be performed at one or more other wireless devices/nodes in communication with the mobile device (e.g., at a location server, such as an E-SMLC server). As illustrated, the procedure 300 includes obtaining 310, at a mobile device, remote transmitter location estimates for one or more remote transmitters (e.g., provided by a location server, such as an E-SMLC server, or some other node or device). In some embodiments, the remote transmitter location estimates may include uncertainties associated with the remote transmitter location estimates. The location uncertainties for pre-determined position estimates for the one or more remote transmitters can be taken into account via, for example, cost function terms (also referred to as inconsistency terms) that, together with the cost function terms defined for PDR measurements and wireless/RF measurements (used to detect transmitters and/or compute position fixes), define a global cost function for which a solution minimum is determined. The assistance data obtained by the mobile device may further include one or more of, for example, floorplan data, street map data, global frame data, local frame data, etc.

The procedure 300 further includes obtaining 320, at the mobile device, a group of pedestrian dead-reckoning (PDR) measurements. The group of PDR measurements (as well as the group of signal measurements for the signals received from the one or more remote transmitters, as more particularly discussed below in relation to block 330 of FIG. 3) may correspond to multiple measurements at different time instances during a time interval, and the least one mobile device location estimate being computed may thus include multiple mobile device location estimates corresponding to at least some of the different time instances during the time interval. In such embodiments, the PDR measurements obtained over a time interval provide a history of PDR samples. The group of PDR measurements provide relative location information (e.g., how far and/or in what direction the device has moved). In some embodiments, the sensor measurements (the PDR) data may be used to constrain the location solution to be derived (e.g., to determine the at least one location estimate for the mobile device and/or to determine an updated, generally more accurate, position/location estimates for the one or more remote transmitters obtained at 310 of FIG. 3) by defining one or more cost function terms corresponding of the cost contribution related to PDR measurements. For example, the PDR measurements can be assumed to define precisely the path following a fixed position determination (e.g., based on RF measurements), in which case the contribution from the PDR measurements may be deemed to be 0. Alternatively, in some embodiments, the PDR measurements are assumed to define a correct shape of the solution path, but the solution path may have to be isotropically scaled and rotated, or the solution path may have to be rotated about some initial point. In some further embodiments, the PDR measurements may be assumed to have uncertainties with respect to the length and heading of the path corresponding to the PDR measurements (e.g., from the mobile device's one or more PDR sensors). In these situations, uncertainties of the path/trajectory corresponding to the PDR measurements can be accounted for through cost function terms reflective of the PDR measurements' uncertainties. When used to generate cost function terms, PDR constraint terms may represent PDR trajectory variations such as, for example, rotation operations applied to a computed PDR trajectory, and/or stretching operations applied to such a computed PDR trajectory. Further details regarding the cost function terms that can be defined for PDR measurements are provided below.

With continued reference to FIG. 3, the procedure 300 also includes obtaining 330, at the mobile device, a group of signal measurements (also referred to as RF scans) for signals received from one or more remote transmitters during the time interval. As discussed herein, in some embodiments, the mobile device may be configured to obtain, e.g., via transceivers such as the transceivers 204, 206, and 208 of the mobile device 200 of FIG. 2) wireless signals from various types of wireless nodes, including from satellite vehicles and/or terrestrial nodes, including from WLAN access points (e.g., WiFi access points), WWAN nodes (eNB nodes, other types of base stations, etc.), femtocells, near-field communication nodes (e.g., Bluetooth® wireless technology, RFID devices, infrared devices, etc.) Transmission from remote wireless nodes are received by the mobile device, and can be used to determine position fixes for the mobile device (e.g., based on signal strength measurements, signal timing measurements, and so on). In some embodiments, and as will be discussed in greater detail below, transmissions from remote wireless transmitters may be individually used to generate inconsistency terms based on which at least one mobile device location estimate is derived, e.g., to define constraint terms for a cost function that is to be solved (e.g., minimized). For example, in such embodiments, constraint terms representative of inconsistencies/discrepancies between the location estimate(s) of the mobile device and, for example, the remote transmitter location estimates for the wireless transmitters that transmitted the transmissions detected by the mobile device may be generated (e.g., the mobile device detects a transmission at a particular time instance from a particular remote transmitter, identifies the transmitter based on data, such as SSID information, in the received/detected transmission, and constructs a constraint term between a location estimate for the mobile device at the particular time instance and known/pre-determined remote transmitter location estimates). The constraint terms may further incorporate uncertainty components for the observed transmitters (e.g., based on signal strength values, such as RSSI, measured for the observed signals). Generally, wireless/RF signal received and detected by the mobile device may be associated with uncertainties, e.g., due to such factors as multipath and signal attenuation, that reduces the confidence in position fixes determined based on such RF/wireless measurements. Accordingly, uncertainties associated with RF/wireless measurements may be accounted for and/or mitigated by introducing cost function terms related to uncertainties associated with these measurements.

Having obtained the PDR measurement data, the signal measurement data, and the remote transmitter location estimates, at least one mobile device location solution is derived 340 based on one or more inconsistency terms representative of inconsistency between different location solutions, for the at least one location estimate, computed using different data points from the remote transmitter location estimates for one or more remote transmitters, the group of PDR measurements, and the group of signal measurements. As noted, in some embodiments, a cost function is constructed to derive the at least one mobile device location by generating constraint terms based on the measured data (e.g., the PDR data, the signal measurements data, and/or the assistance data), and minimizing the generated cost function to determine an optimal, or near optimal, solution (which may include the at least one location estimate(s) for the mobile device) that minimizes the cost function. Thus, in such embodiments, deriving the at least one mobile device location estimate may include deriving a cost function comprising variable constraint terms representative of the inconsistency terms, and minimizing the cost function to determine the at least one mobile device location estimate that minimizes the inconsistency between the different location solutions, for the at least one mobile device location estimate, computed using the different data points from the remote transmitter location estimates, the group of PDR measurements, and the group of signal measurements. The at least one mobile device location estimate may include multiple mobile device location estimates for the mobile device at different time instances, and deriving the cost function may include determining the cost function based on, for example, 1) a first cost contribution computed based on first inconsistency terms between a first group of the multiple mobile device location estimates and position fixes for the mobile device, 2) a second cost contribution of second inconsistency terms between a second group of the multiple mobile device location estimates and the remote transmitter location estimates, 3) a third cost contribution of third inconsistency terms between a third group of the multiple mobile device location estimates and updated remote transmitter location estimates of the one or more remote transmitters, 4) a fourth cost contribution of fourth inconsistency terms between a fourth group of the multiple mobile device location estimates and one or more PDR trajectories computed at least in part based on the group of PDR measurements, and/or 5) a fifth cost contribution of fifth inconsistency terms between the updated remote transmitter location estimates and the remote transmitter location estimates. In some embodiments, the fourth cost contribution of the fourth inconsistency between the fourth group of the multiple mobile device location estimates and the one or more PDR trajectories may include cost variable constraint terms representative of PDR trajectory variations. In such embodiments, the PDR trajectory variations may include a rotation operation applied to a PDR trajectory derived based on the group of PDR measurements, and/or a stretching operation applied to the PDR trajectory. Other types of inconsistencies, discrepancies, or error terms may be defined (e.g., according to the measured data obtained by the mobile device) to generate additional types of constraint terms contributing to the overall cost function. It is to be noted that at least some of the one or more location estimates for the mobile device may correspond to constraint terms of different contributions. That is, a particular position estimate, $X_p$, corresponding to a particular time instance, $T_p$, may be used to define constraint terms in more than one type of cost contribution, i.e., the location estimate may be used to define a constraint term as a discrepancy derived from PDR measurements at the time, $T_p$, as well as to define another discrepancy with a position fix made at the time $T_p$ and/or to define a further discrepancy with a location/position estimate of a wireless remote transmitter from which a transmission was detected by the mobile device at the time $T_p$. Thus, there may be some overlap in location estimate terms for the first group, the second, the third group, and/or the fourth group of the one or more position estimates for the mobile device.

As noted, in some embodiments, multiple signal measurements may be used to define constraint terms for the first cost contribution. For example, the signal measurements may be used to compute position fixes for the mobile device (e.g., locally at the device, based on signal strength or timing measurements from received signal, or remotely, by sending the signal measurements to a remote server to compute position fixes for the mobile device). For instance, based on satellite signals (GNSS signals) received by the mobile device (e.g., via a receiver such as the receiver 208 depicted in FIG. 2), the mobile device, or a remote server (receiving from the mobile device data that includes measurements performed by the mobile device), computes a position fix (which may be associated with some uncertainty level). In another instance, wireless signals from remote ground transmitters may be received and used to compute (locally at the mobile device, or remotely at a server such as a location server) additional position fixes. The computed position fixes may be associated with some uncertainly factor, and therefore may not represent an entirely accurate location estimate for the mobile device. These position fixes (at different points on the trajectory, and for different points in time during which measurements are performed) may be used to define inconsistency terms (constraint terms) between the mobile device location estimate(s) (that are to be solved/derived using, for example, a cost function) and the corresponding position fixes.

In some embodiments, the multiple signal measurements may also be used to define constraint terms (e.g., discrepancy terms) between mobile device location estimate(s) (for the mobile device along points of the trajectory, and for different points in the time interval during which data is obtained) and corresponding remote transmitter location estimates of the remote transmitters. For example, in some situations, raw signal strength or timing measurements for signals transmitted by remote transmitters may not be possible or practical (e.g., if the mobile device lacks the hardware to perform such measurements, or if the remote transmitters are too sparsely or too densely deployed in the area for which position estimate(s) for the mobile device is to be derived), and as a result it may be difficult to define constraint terms based on position fixes. In such situations, constraint terms relating mobile device location estimates (for the mobile device) and identity/position of the remote transmitters may be defined instead of, or in addition to, the constraint terms defined based on position fixes. For example, a constraint term may be defined as a discrepancy between a location estimate for the mobile device at some time instance $T_n$, and the location of a remote transmitter from which the mobile device received a signal at the time instance $T_n$. The identity of the remote transmitter from which the wireless signal was received at the time instance $T_n$ may be provided with control information included in the signal (e.g., SSID data included in the signal). Similar constraint terms may be defined based on other wireless/RF signals received by the mobile device during the time for which the cost function is being solved (associating mobile device location estimates for the mobile device at various time instances with locations of the remote transmitters that transmitted the wireless/RF signals detected by the mobile device). In some embodiments, constraint terms associating the mobile device location estimates with the transmitter location estimates for the remote transmitters transmitting the RF/wireless signals detected by the mobile device may be used if position fixes (requiring more exact signal strength or timing measurements), based on the transmissions from the remote transmitters, cannot be computed. In some other situations, the constraint terms associating the mobile device location estimates with the transmitter location estimates may be used in conjunction with constraint terms corresponding to the mobile device location estimates and the position fixes.

In some embodiments, minimizing a cost function may include generating a sum of squared terms of the cost contributions (e.g., one or more of the first inconsistency terms, the second inconsistency terms, the third inconsistency terms, the fourth inconsistency terms, and/or the fifth inconsistency terms), and weighting one or more of the squared terms of the sum according to respective uncertainties (e.g., uncertainties associated with the one or more of the first inconsistency terms, the second inconsistency terms, the third inconsistency terms, the fourth inconsistency terms, and/or the fifth inconsistency terms).

Figure 4A:
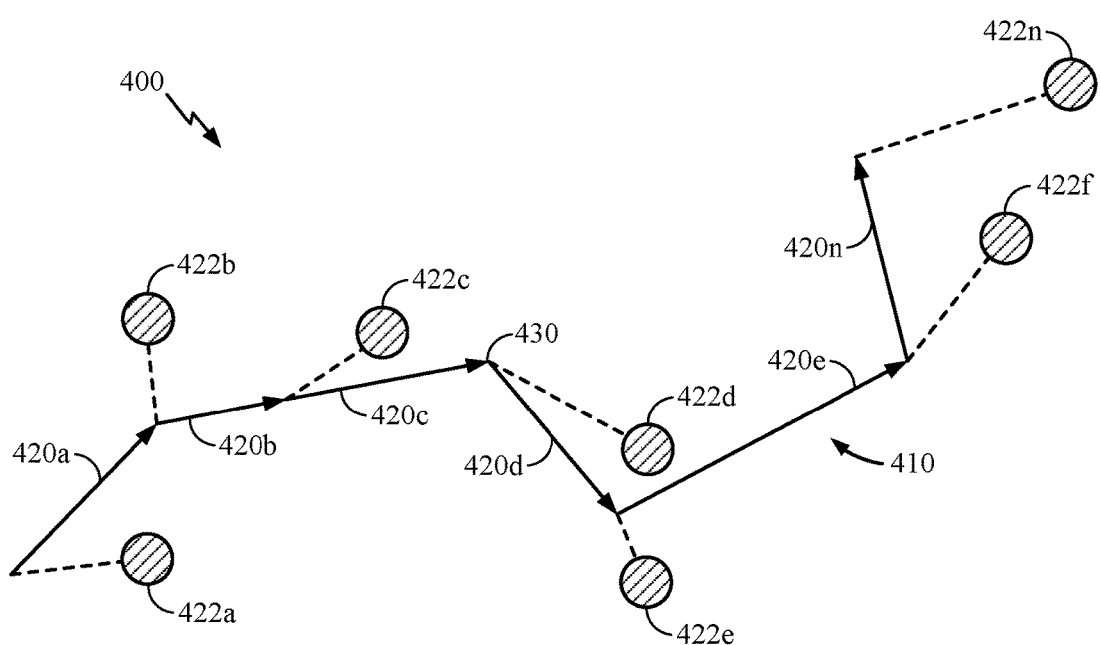
FIG. 4A is a diagram showing a mobile device configured to derive a location solution based on measurements from different sources while traveling along a trajectory.

To illustrate the process of deriving at least one mobile device location estimate through minimization and derivation of a cost function, consider, with reference to FIG. 4A, an example trajectory 410 taken over a period of time T1 and T2 (the trajectory 410 may be the same or different from the trajectory 120 illustrated in FIG. 1). In FIG. 4A, the arrow vectors segments 420a-n indicate a path (or an approximation thereof) traveled by the mobile device (or by the user carrying the mobile device). The arrow vectors 420a-n may be constrained to be similar to the relative PDR updates, where the strength of the constraints is based on the confidence of the updates. Circles 422a-n represent absolute position fixes (i.e., estimates of the user location) derived, for example, based on wireless signal measurements (from GNSS, or from signals transmitted by terrestrial wireless nodes, such as WiFi nodes, BLE nodes, Bluetooth nodes or WWAN (cellular) nodes). The dotted lines indicate the points along the trajectory 410 at which respective position fixes were made (e.g., the point 430 at the arrow of the vector segment 420c corresponds to the position fix 422d in the example of FIG. 4A).

Figure 4B:
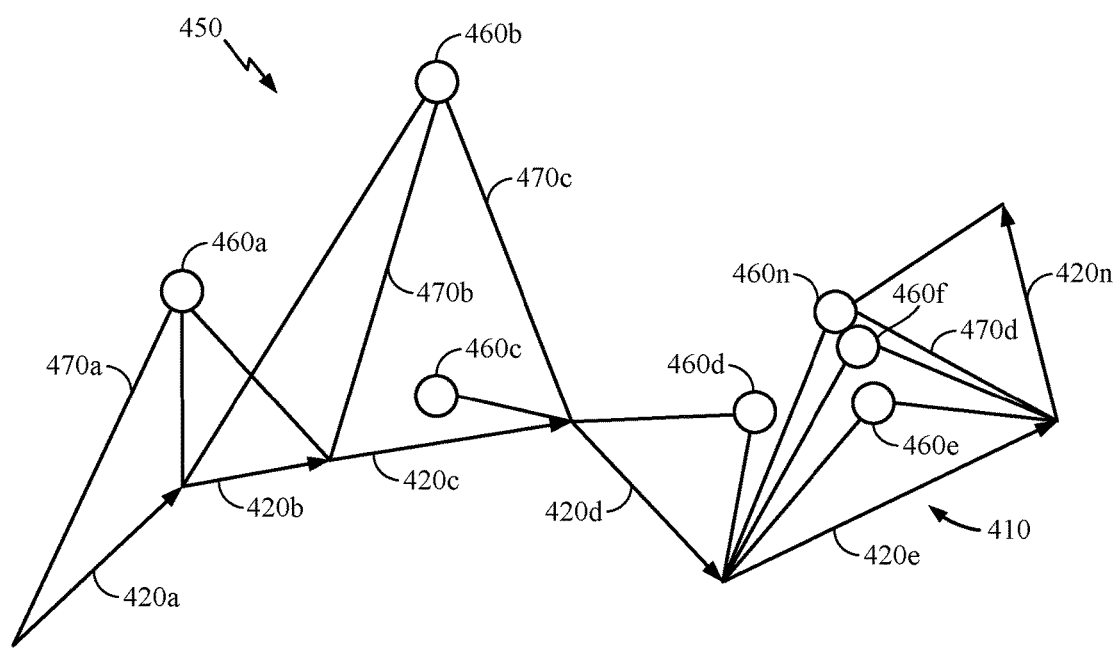
FIG. 4B is a diagram showing positions of transmitters transmitting wireless signals detectable by the mobile device traveling along the trajectory shown in FIG. 4A.
Figure 4C:
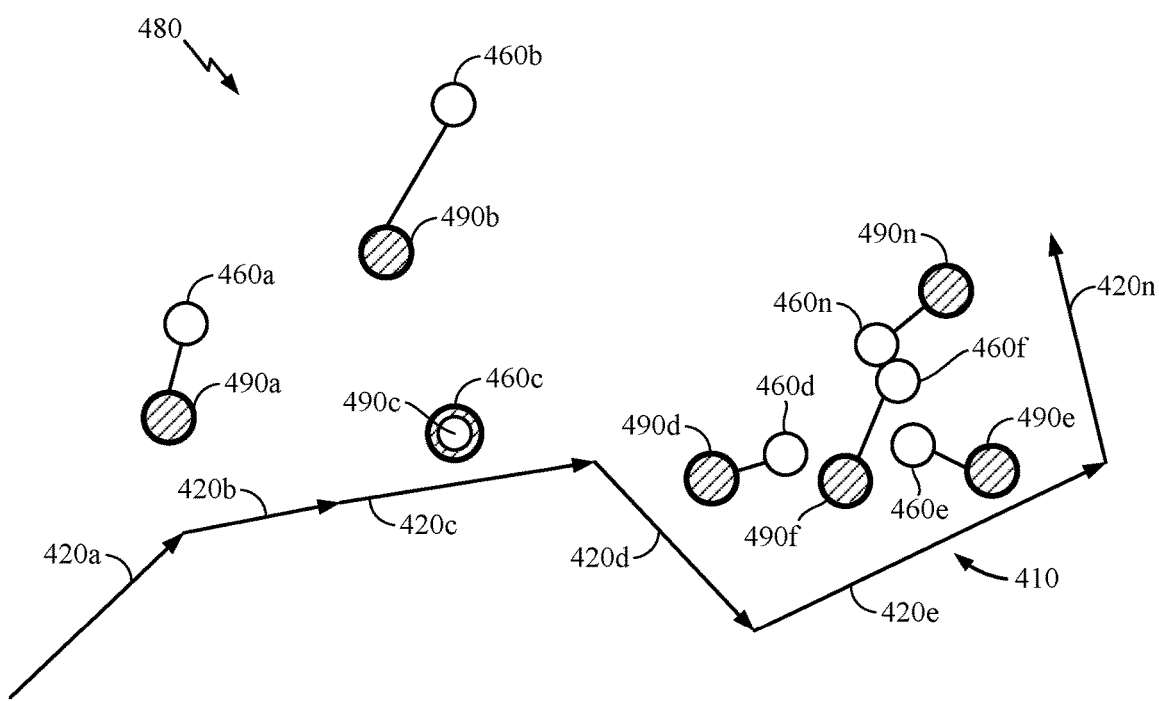
FIG. 4C is a diagram showing varying of position estimates of the transmitters transmitting the wireless signals detectable by the mobile device traveling along the trajectory shown in FIGS. 4A-B.

FIG. 4B is a diagram 450 showing positions of one or more transmitters 460a-n transmitting wireless signals detectable by the mobile device of the user traveling along the trajectory 410 (depicted in both FIGS. 4A and 4B). The lines (such as example lines 470a-d) extending from the various one or more transmitters 460a-n represent the epochs at which the transmitters 460a-n were observed (a particular transmitter may be observed at different epochs). As noted, the position of each of the transmitters 460a-n may be associated with an uncertainty value, representative of some degree of possible error associated with that position. An error associated with the position of a particular transmitter will be present each time it is used, so there is a potential for introducing this error repeatedly if the same transmitter is seen multiple times during the user trajectory. In order to counter the effect of this error correlation, the approaches described herein may be used to not only solve the user's (or mobile device's) location/position estimate, but also to solve for updated location estimates for the one or more remote transmitters (transmitting the signals observed/measured by the mobile device). Therefore, by using a cost function (or via some other optimization process) to derive mobile device location estimate(s), the pre-determined location estimates (provided in, for example, assistance data) for the one or more transmitters 460a-n can be varied (e.g., according to their uncertainties) to eliminate or decrease one source of error bias associated with the system. Thus, for example, FIG. 4C includes a diagram 480 illustrating how the estimated positions of the transmitters 460a-n (depicted in FIG. 4B) are allowed to vary according to the uncertainty associated with each of the transmitters' positions (e.g., the variation in the location/position estimate of each transmitter may be constrained according to the uncertainty value, also referred to as position confidence, associated with the each transmitter). The varied location estimates corresponding to the respective transmitters 460a-n are illustrated as locations 490a-n (i.e., represented as ringed circles). In the example illustrated in FIG. 4C, the location estimate 490c corresponding to the transmitter 460c remains substantially the same as it was during the solution instance represented by FIG. 4B. However, during the derivation of the location estimates for the mobile device, the location estimate for the transmitter 460c may be varied to some other possible position (constrained by the uncertainty associated with the transmitter 460c). In some situations, the updated/improved location estimates for the remote transmitters may be provided to a remote transmitter/server for future use (e.g., to be used for location determination for other devices); however, in some situations, the remote transmitters' updated location estimates may be used only for the current location solution, and thereafter discarded.

As discussed, in some embodiments, determining and minimizing the cost function may include determining a cost function based on one or more cost contributions that include, for example, contribution factors such as: 1) inconsistencies/discrepancies between a hypothesized track/trajectory and a relative PDR track, 2) inconsistencies/discrepancies between a hypothesized track and position fixes computed externally (e.g. based GNSS measurement and/or RF signal measurements from one or more terrestrial nodes), 3) inconsistencies/discrepancies between a hypothesized track and provided transmitter locations (e.g., pre-determined location estimates for such transmitters that are available from a database), 4) inconsistencies/discrepancies between a hypothesized track and hypothesized transmitter locations, and/or 5) inconsistencies/discrepancies between hypothesized transmitter locations and provided (pre-determined or pre-existing) transmitter locations. Other cost contributions, for other constraints (e.g., constraints that are based on discrepancies between possible solution values and given measurements), or other types of functions to express the inconsistencies between different location solutions, may also be defined and used. In some embodiments, the cost function may be constructed based on a combination of one or more of the above cost contributions. For example, the cost function may be constructed based on the contribution factors 1, 2, and 3, contribution factors 1, 2, 4, 5, or some other combination of contribution factors.

In some embodiments, derivation of a mobile device location estimate(s) may be performed as follows. An example cost function associates a numerical cost with the path/trajectory under consideration, together with a set of positions of transmitters observed during the path. This collection of variables can be expressed in vector form as:

$$(X_1^T, \ldots, X_n^T | a_1^T, \ldots, a_m^T) \qquad (1)$$

in which each of the variables to the left of the bar is a Cartesian column vector. Each of these vectors corresponds to a possible mobile device location estimate at a certain time (the vectors may be arranged from earliest to latest, in some embodiments). Every wireless/RF measurement and every position fix within the scope of the problem may occur at a unique time instance, with each time instance associated with a possible device location estimate corresponding to that time. Additionally, the mobile device also obtain PDR measurements associated with at least some of these times (e.g., the mobile device may perform sensor measurements for at least one or more of the time instances at which the wireless measurements from remote transmitters have been obtained). As noted, the PDR data may be used to constrain device position estimates. A PDR 'delta' (a Cartesian vector difference of user device positions), $\Delta_k$, spans times indexed k to k+1 and may be compared with the difference $X_{k+1}-X_k$. In Equation (1), the terms appearing to the right of the bar (i.e., to the right of the symbol '|') represent possible location estimates for each of the remote transmitters (which may be similar to the transmitters 460a-n depicted in FIGS. 4B-C) transmitting wireless/RF signals, and observed in the totality of the RF scans/measurements obtained by the mobile device (e.g., during the time interval for which the mobile device location estimate(s) is/are derived). These remote transmitter location estimate variables are constrained by fixed estimates of the locations of those transmitters (as may have provided by a transmitter database, some or all of which may have been communicated to the mobile device as assistance data), with the $k^{th}$ such position estimate being denoted as $A_k$.

The value returned by the cost function is a sum of cost contributions from position fixes (denoted $E_{PF}$, where E represents energy), cost contributions corresponding to RF measurements, and cost contributions corresponding to PDR measurements, with each contribution being built up from constraints on the elements provided in Equation (1). Thus:

$$E=E_{PF}+E_{RF}+E_{PDR}. \quad (2)$$

The terms of Equation (2) are now considered. Starting first with the position fix term ($E_{PF}$), a particular position fix (e.g., the $i^{th}$ position) is used to constrain one of the mobile device location estimates in (1), i.e., constraining the location/position estimate associated with the time of the position fix in question. Because device location estimates in (1) correspond not only to the times of position fixes but also to RF scans, care must be taken to ensure that the correct mobile device location estimate is selected. For notational convenience, the function $\phi PF$ is introduced that selects the index of that unique device location estimate contemporaneous with the given position fix. Let the $i^{th}$ position fix in a problem be represented by the Cartesian position vector $P_i$, and its associated position error covariance matrix be $C_{PFi}$. Then:

$$E_{PF}=\Sigma_{i=1}^{nPF}(X_{\phi PF(i)}-P_i)^T C_{PFi}^{-1}(X_{\phi PF(i)}-P_i) \quad (3)$$

Next, consider the wireless/RF measurement contribution, $E_{RF}$, to the cost function. To define the RF contribution, the same indexing device described above is used, and the functions $\phi RF$ is introduced to map an RF observation to its corresponding device location estimate, and $\phi A$ to map the observation to its corresponding transmitter location estimate. These functions are typically many-to-one, because many RF observations may be made on the same scan, and the same remote transmitter may be observed multiple times over all the scans contributing to the problem. Thus, for example, determining the cost contribution corresponding RF measurements/scans may include mapping respective ones of the multiple signal measurements to corresponding ones of a group of one or more location estimates for the mobile device and to corresponding ones of pre-determined transmitter location estimates (and/or updated/improved locations) for the one or more remote transmitters.

In describing the contribution of RF measurements to the cost function, two configurations are possible. The first configuration, denotes, RF1, is a simple constraints configuration. The cost contribution in this case looks very similar to that for position fixes, with each measurement being effectively treated as a position fix where the location estimate is that of the transmitter in the database. Thus, using notation similar to that used in Equation (3):

$$E_{RF}=\Sigma_{i=1}^{nRF}(X_{\phi RF(i)}-\phi A(i))^T C_{RFi}^{-1}(X_{\phi RF(i)}-\phi A(i)) \quad (4)$$

Thus, for the first RF configuration, RF1, only the supplied transmitter location/position estimates ('$A_i$') may be used to constrain the device's location estimate(s), and, in this situation, the uncertainties associated with the transmitter location/position estimates ('$A_i$'s) are not used.

The second configuration, denoted RF2, to treat RF measurements, is the double constraints configuration. In this case, the location estimates for the remote transmitters in the cost function minimization are further solved, using the database locations/positions to constrain the solution. The benefit to the solution is that errors in the transmitter database are not disproportionally represented in the final solution. The cost contribution in this case contains an extra contribution from each transmitter. Thus, the RF contribution for the second configuration, RF2, can be represented as:

$$E_{RF}=\Sigma_{i=1}^{nRF}(X_{\phi RF(i)}-a_{\phi A(i)})^T C_{RFi}^{-1}(X_{\phi RF(i)}-a_{\phi A(i)})+ \Sigma_{i=1}^m (a_i-A_i)^T C_{A(i)}^{-1}(a_i-A_i) \quad (5)$$

In this configuration, hidden variables ('a's) are introduced, that make use of the uncertainties (namely, ($CA_i$)) associated with the transmitter location estimates ('$A_i$')

Next, in describing the contribution of PDR to the cost function, a number of optional configurations are possible. In the first PDR configuration, referred to as the rigid constraints configuration and denoted as PDR1, the shape and orientation of the solution is defined precisely by PDR. In this case, $E_{PDR}=0$, and PDR is used solely to constrain all of the solution path after the initial position absolutely by applying the relationship:

$$X_r=X_1+\Sigma_{k=1}^{r-1}\Delta_k. \quad (6)$$

Here, minimization is performed over the variables $(X_1^T|a_1^T,\ldots,a_m^T)$. In a second PDR configuration, referred to as similar constraints configuration and denoted PDR2, the solution path retains the same overall shape of the PDR data but may be isotropically scaled and rotated with respect to the original PDR. The similarity transform is described by $$D=\lambda_{SL}\begin{pmatrix} \cos\vartheta_H & -\sin\vartheta_H \\ \sin\vartheta_H & \cos\vartheta_H \end{pmatrix} \ni \lambda_{SL}>0 \quad (7)$$

in which $\lambda_{SL}$ is the scale factor and $\vartheta_H$ is the rotation angle. The constraint on the device position estimates is then $$X_r=X_1+D\Sigma_{k=1}^{r-1}\Delta_k \quad (8)$$

and there is a cost associated with the distortion (by the similarity transform) of PDR, namely:

$$E_{PDR}=((\lambda_{SL}-1)/\sigma_{SL})^2+(\vartheta_H/\vartheta_H)^2 \quad (9)$$

Here, minimization is over the variables $(X_1^T|a_1^T,\ldots,a_m^T|\vartheta_H,\lambda_{SL})$.

In a third PDR configuration, referred to as pivot constraints configuration and denoted PDR3, the configuration is a generalization of the similarity constraint configuration. Each of the PDR 'deltas' is permitted to rotate about its initial point, but this pivoting is constrained by the uncertainty in its associated heading angle. This flexibility is applied in addition to (actually prior to) the global path distortion (by similarity) described herein. To describe the resulting path constraint and PDR contribution to the cost function, the $k^{th}$ PDR delta is associated with a pivot angle $\partial_k$, and defines:

$$M_k = \begin{pmatrix} \cos\partial_k & -\sin\partial_k \\ \sin\partial_k & \cos\partial_k \end{pmatrix}. \quad (10)$$

The path constraint may then be written as:

$$X_r = X_1 + D \sum_{k=1}^{r-1} M_k \Delta_k \quad (11)$$

with the contribution to the cost function being:

$$E_{PDR} = \sum_{i=1}^{n-1} (\partial_k / \sigma_{Hk})^2 + ((\lambda_{SL} - 1)/\sigma_{SL})^2 + (\partial_H / \sigma_H)^2 \quad (12)$$

Minimization is performed over the variables $(X_1^T | \partial_1, \ldots, \partial_{n-1} | a_1^T, \ldots, a_m^T | \partial_H, \lambda_{SL})$.

A fourth PDR configuration, namely, a general constraints configuration, denoted PDR4, is a general use of PDR, and simply uses the uncertainties in length and heading for each PDR delta (or a Cartesian uncertainty ellipse/ellipsoid), and applies the constraints on the path entirely through the cost function contribution. Thus:

$$E_{PDR} = \sum_{i=1}^{n-1} (X_{i+1} - X_i - \Delta_i)^T C_{PDRi}^{-1} (X_{i+1} - X_i - \Delta_i) \quad (13)$$

Minimization is performed over the variables of Equation (1). A simple variant of this is to include a global distortion, with $$E_{PDR} = \sum_{i=1}^{n-1} (X_{i+1} - X_i - D\Delta_i)^T C_{PDRi}^{-1} (X_{i+1} - X_i - D\Delta_i) + \quad (14)$$

$$((\lambda_{SL} - 1)/\sigma_{SL})^2 + (\partial_H / \sigma_H)^2$$

Minimization is then over the variables $(X_1^T, \ldots, X_n^T | a_1^T, \ldots, a_m^T | \partial_H, \lambda_{SL})$.

In some embodiments, another manifestation of position error biases comes from position fix error correlation. That is, over a short interval, errors in GNSS or Wi-Fi position estimates are highly correlated, owing to consistent multipath or signal attenuation. This effect is ameliorated by applying a down-weighting factor, $0 \leq \omega_i \leq 1$, to each position fix in the cost contribution given in Equation (3), to yield:

$$E_{PF} = \sum_{i=1}^{nPF} (X_{\phi PF(i)} - P_i)^T C_{PFi}^{-1} (X_{\phi PF(i)} - P_i) \omega_i \quad (15)$$

Here, $\omega_i$ may be based, for example, on its proximity in time or distance travelled (based on PDR) to other position fixes used in the calculation. Two position fixes made in very rapid succession may be considered to have identical errors (i.e., they may be fully correlated), and the corresponding values of $\omega_i$ may be set to 0.5 or less. A position fix made far apart from any other in time or PDR-based distance may receive $\omega_i$ values of 1. A similar scheme may be used with the RF measurements. Here, the individual measurement contributions given in Equation (4) are down-weighted in a similar fashion.

$$E_{RF} = \sum_{i=1}^{nRF} (X_{\phi RF(i)} - a_{\phi A(i)})^T C_{RFi}^{-1} (X_{\phi RF(i)} - a_{\phi A(i)}) \omega_i + \sum_{i=1}^{m} (a_i - A_i)^T C_{A(i)}^{-1} (a_i - A_i). \quad (16)$$

Thus, in some embodiments, a procedure to determine location information (such as the procedure 300 of FIG. 3) may further include applying weights to at least some terms of the cost function (e.g., constraint terms) based on at least one of time or distance between one or more of the position fixes for the mobile device and another one or more of the position fixes for the mobile device.

Another enhancement to the cost function definition is the greater down-weighting of contributing terms that occur closer to the beginning of the track (this type of down-weighting is referred to as tapering). Here, a factor $0 \leq \tau \leq 1$, is applied to each of the contributions in $E_{PF}$, $E_{RF}$ and $E_{PDR}$. Typically, $\tau$ might be defined by a monotonically increasing function, starting at or close to 0 at the beginning of the track and taking the value 1 for the most recent set of measurements. Tapering weights are therefore applied to recent cost function contributions more heavily than to distant ones, as the current user position is generally of more interest. It also has the effect of smoothing the output user trajectory. Thus, in such embodiments, the procedure to determine location information may include applying weights to respective terms of the position fixes contribution ($E_{PF}$, or the first cost contribution), the RF cost contribution ($E_{RF}$, also referred to as the second contribution), and the PDR cost contribution ($E_{PDR}$, also referred to as the third contribution), such that one group of terms, from the respective terms, corresponding to a more recent set of measurements used to determine the one group of terms, is weighted more heavily than another group of terms, from the respective terms, corresponding to an earlier set of measurements used to determine the other group of terms.

In some embodiments, minimization of a cost function (or some other function that expresses location solutions inconsistencies) defined to account for the various cost contributions (as described herein) may be performed based on differentiating the cost function terms/contributions, and using the cost function derivative(s) to identify minima values (corresponding to the values that would minimize the cost function), or to otherwise identify optimum values for the cost function. The minimization may be performed based on such techniques/procedures as conjugate gradients (which is effective in situations where the functions on which optimization is performed is quadratic, or near-quadratic, shaped), simplex methods, simulated annealing, genetic algorithms, etc. The minimization process applied to the cost function thus facilitates derivation of a location estimate for the mobile device. For example, the minimization process applied to the cost function defined herein (e.g., a cost function including the various cost function contributions) provides a location estimate for the mobile device (or several such estimates) for respective times instances during the interval in which the various measurements were performed, and may also provide updated (e.g., improved/more accurate) remote transmitter location estimates for the one or more remote transmitters transmitting RF signals.

To further illustrate the derivation of a mobile device location estimate(s) using a cost function, consider the following, non-limiting, examples of determination and minimization of a cost functions. In a first example, two signals, a weak signal from a transmitter $A_1$ and a strong signal from a transmitter $A_2$, are detected/heard simultaneously, and so the location of the mobile device and/or the user may be determined based on the given positions of the transmitters and the strengths of the received signals. The uncertainty values (sigmas; $\sigma$'s) may be functions of the received signal strengths. Because the transmitter $A_2$ is heard more strongly (i.e., $\sigma_2$ is small), the final solution for the user position should be closer to $A_2$ than $A_1$. A possible cost function, $E_1$, that may be constructed for this example may be:

$$E_1 = \frac{(X - A_1)^2}{\sigma_1^2} + \frac{(X - A_2)^2}{\sigma_2^2}$$

In this case, the cost function, $E_1$, is minimized to find a location solution for X which is:

$$X = \frac{\sigma_2^2 A_1 + \sigma_1^2 A_2}{\sigma_1^2 + \sigma_2^2}$$

The resultant solution for X (i.e., the mobile device location estimate) is such that it is closer to $A_2$ because $\sigma_1^2 > \sigma_2^2$.

In another, second example, there are two scan times ($t_1$ and $t_2$). If the two scans were treated individually, this would result in two separate solutions $X_1$ at $t_1$, and $X_2$ at $t_2$. However, PDR measurements may provide information on how the mobile device may have moved during the period $t_1$ to $t_2$, and this additional PDR information may constrain the difference ($\Delta$) of $X_2 - X_1$ according to the uncertainty associated with the PDR measurements (denoted $\sigma_{PDR}$). Thus, the PDR term couples the solutions at $t_1$ and $t_2$. It is to be noted that PDR data does not provide a position fix, but rather provides a change in position (delta) between the two times. In this case, an example cost function, $E_2$, that may be constructed that incorporates the additional constraints based on the PDR as follows:

$$E_2 = \frac{(X_1 - A_1)^2}{\sigma_{A1}^2} + \frac{(X_2 - A_2)^2}{\sigma_{A2}^2} +$$
$$\frac{(X_2 - A_3)^2}{\sigma_{A3}^2} + \frac{(X_2 - A_4)^2}{\sigma_{A4}^2} + \frac{((X_2 - X_1) - \Delta_{PDR})^2}{\sigma_{PDR}^2}$$

In the above example for the cost function $E_2$, $A_3$ and $A_4$ correspond to the transmitters observed at the time instance $t_2$. The PDR constraint in the above cost function reflects the contribution of PDR measurements to the determination of the location/position estimates of $X_1$ and $X_2$, in that the positional difference between $X_1$ and $X_2$ should be consistent with the PDR measurements.

In a third example, the mobile device detects (hears) the transmitters $A_1$ and $A_2$ at $t_1$, and detects the transmitters $A_1$ and $A_3$ at time $t_2$. However, in this example, there is some uncertainty associated with the known location estimates for the remote transmitters, and so hidden variables $a_1$, $a_2$ and $a_3$ are introduced. These hidden variables can be used to represent more accurate location estimates for the transmitters, and are constrained to be near the transmitter location estimates provided to the mobile device from outside (e.g., via assistance data). Thus, deriving a mobile device location estimate includes not only determining the user positions at time $t_1$ and/or $t_2$, but also determining estimates for these hidden variables (these estimates may not be the actual positions of the transmitters, but rather are representative of more accurate location estimates). An example cost function, $E_3$, for this situation may depend not only on $X_1$ and $X_2$, but also on a1, a2, and $a_3$, and may be constructed as follows:

$$E_2 = \frac{(X_1 - a_1)^2}{\sigma_{A1}^2(t_1)} + \frac{(X_1 - a_2)^2}{\sigma_{A2}^2(t_1)} + \frac{(X_2 - a_1)^2}{\sigma_{A1}^2(t_2)} + \frac{(X_2 - a_3)^2}{\sigma_{A3}^2(t_2)} +$$

-continued
$$\frac{((X_2 - X_1) - \Delta_{PDR})^2}{\sigma_{PDR}^2} + \frac{(a_1 - A_1)^2}{\tau_1^2} + \frac{(a_2 - A_2)^2}{\tau_2^2} + \frac{(a_3 - A_3)^2}{\tau_3^2}$$

In the above example of $E_3$, the terms $\tau_1$, $\tau_2$, and $\tau_3$ represent the uncertainties associated with the respective known (pre-determined) location estimates for the transmitters $A_1$, $A_2$, and $A_3$. It is to be noted that there is only one hidden variable constraint for each transmitter. In this example, $A_1$ is heard both at $t_1$ and $t_2$, so $a_1$ appears in constraints on user positions at both times. As noted, the hidden variables may be constrained to be near their corresponding transmitters, and can be thought of the being attached to their respective transmitters by imaginary springs that inhibit how far the hidden variables can stray from their respective transmitters. In some embodiments, the constraints on $X_1$ and $X_2$ may be down-weighted due to detecting/hearing $A_1$ at both times $t_1$ and $t_2$ in order to avoid introducing associated errors multiple times (these signals may contain essentially the same, or very similar, information).

Figure 5:
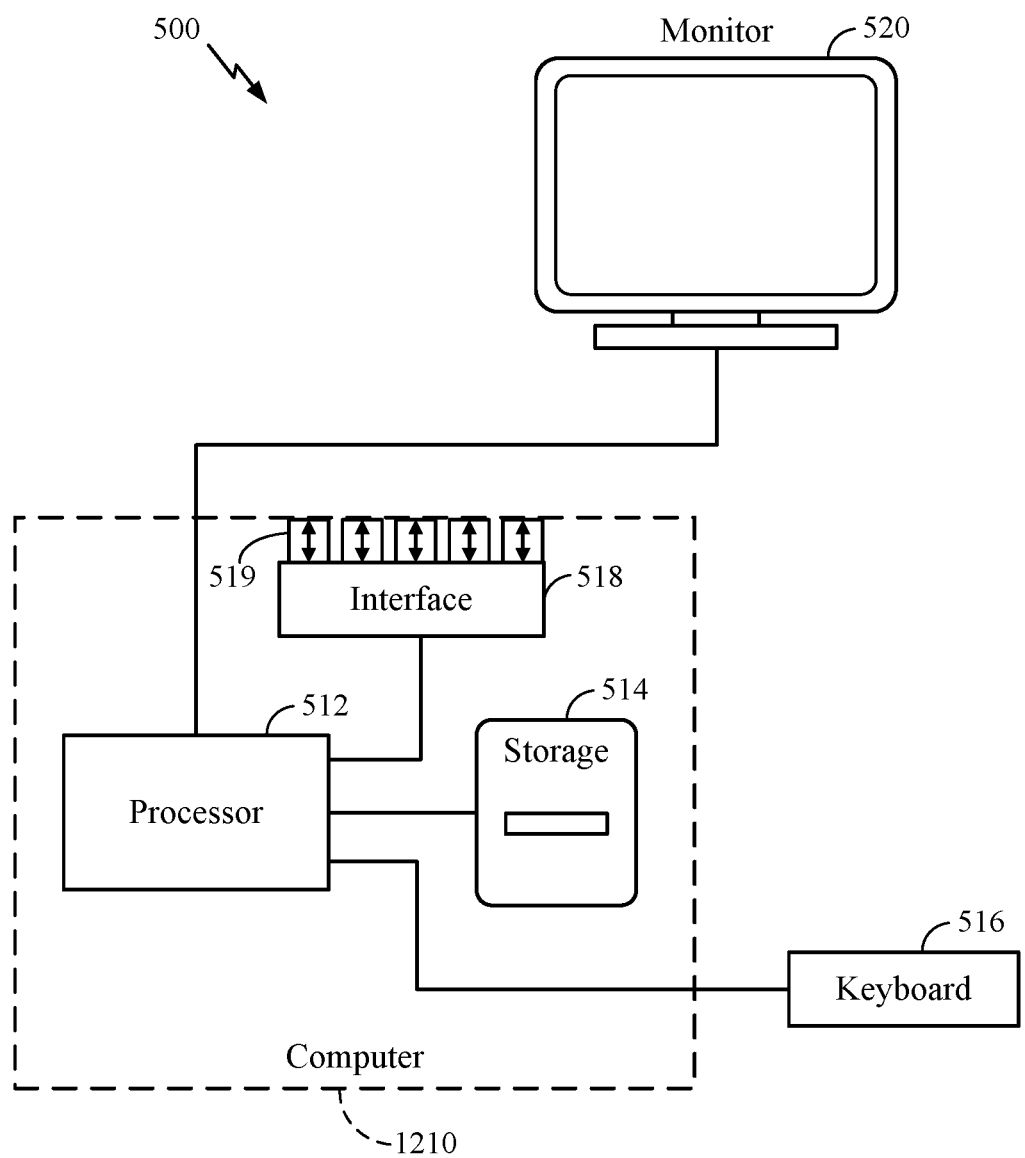
FIG. 5 is a schematic diagram of a computing system, in accordance with certain example implementations.

Performing the procedures described herein may be facilitated by a processor-based computing system. With reference to FIG. 5, a schematic diagram of an example computing system 500 is shown. Part or all of the computing system 500 may be housed in, for example, a handheld mobile device such as the devices 108 and 200 of FIGS. 1 and 2, respectively, or may comprise part or all of the servers, nodes, access points, or base stations described herein, including the devices/nodes 104a-c, 106a-d, and 110 depicted in FIG. 1. The computing system 500 includes a computing-based device 510 such as a personal computer, a specialized computing device, a controller, and so forth, that typically includes a central processor unit 512. In addition to the CPU 512, the system includes main memory, cache memory and bus interface circuits (not shown). The computing-based device 510 may include a mass storage device 514, such as a hard drive and/or a flash drive associated with the computer system. The computing system 500 may further include a keyboard, or keypad, 516, and a monitor 520, e.g., a CRT (cathode ray tube) or LCD (liquid crystal display) monitor, that may be placed where a user can access them (e.g., a mobile device's screen).

The computing-based device 510 is configured to facilitate, for example, the implementation of one or more of the procedures/processes/techniques described herein, including the procedures to derive a mobile device location estimate(s) based on inconsistencies between different location solutions (for the mobile device location estimate(s)) computed using different data points from PDR measurements, RF measurements, available position fixes (e.g., based on GNSS procedures), remote transmitter location estimates (e.g., provided with assistance data), etc., obtained at, or for, a mobile device. The mass storage device 514 may thus include a computer program product that when executed on the computing-based device 510 causes the computing-based device to perform operations to facilitate the implementation of the procedures described herein. The computing-based device may further include peripheral devices to provide input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. For example, as illustrated in FIG. 5, the computing-based device 510 may include an interface 518 with one or more interfacing circuits (e.g., a wireless port that include transceiver circuitry, a network port with circuitry to interface with one or more network device, etc.) to provide/implement communication with remote devices (e.g., so that a wireless device, such as the device 200 of FIG. 2, could communicate, via a port such as the port 519, with a remote device or node). Alternatively and/or additionally, in some embodiments, special purpose logic circuitry, e.g., an FPGA (field programmable gate array), a DSP processor, or an ASIC (application-specific integrated circuit) may be used in the implementation of the computing system 500. Other modules that may be included with the computing-based device 510 are speakers, a sound card, a pointing device, e.g., a mouse or a trackball, by which the user can provide input to the computing system 500. The computing-based device 510 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the computing-based device 510 or external to the device. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, flash drives (including flash drives connectable to the computing system 500 via a USB interface), or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

The detailed description set forth above in connection with the appended drawings is provided to enable a person skilled in the art to make or use the disclosure. It is contemplated that various substitutions, alterations, and modifications may be made without departing from the spirit and scope of the disclosure. Throughout this disclosure the term "example" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

Although particular embodiments have been disclosed herein in detail, this has been done by way of example for purposes of illustration only, and is not intended to be limiting with respect to the scope of the appended claims, which follow. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method to determine location information, the method comprising:
   determining, at a mobile device, a first position of the mobile device at a first time;
   obtaining, at the mobile device, remote transmitter location estimates for one or more remote transmitters, the one or more remote transmitters comprising one or more terrestrial nodes;
   obtaining, at the mobile device, a group of pedestrian dead-reckoning (PDR) measurements from one or more inertial sensors of the mobile device, the one or more inertial sensors including: a gyroscope, an accelerometer, or a magnetometer, or any combination thereof;
   determining, at the mobile device, a trajectory based on the PDR measurements between the first time and a second time;
   obtaining, at the mobile device, a group of signal measurements for signals received from the one or more remote transmitters at the second time;
   determining, at the mobile device, a second position of the mobile device based on one or more of the group of signal measurements received at the second time;
   determining, at the mobile device, a constrained location estimate based on the first position and the trajectory, wherein the constrained location estimate includes an area of uncertainty;
   calculating, at the mobile device, a positional difference between the second position and the constrained location estimate, wherein the position difference is a distance between the second position and a point within the area of uncertainty that is closest to the second position; and
   determining a current position of the mobile device as the point within the area of uncertainty that is closest to the second position.

2. The method of claim 1, wherein obtaining the remote transmitter location estimates for the one or more remote transmitters further comprises:
   obtaining, at the mobile device, uncertainties associated with the remote transmitter location estimates.

3. The method of claim 1, wherein determining the constrained location estimate includes applying a rotation operation to the trajectory to minimize the distance between the second position and the point within the area of uncertainty that is closest to the second position.

4. The method of claim 1, wherein determining the constrained location estimate includes applying a stretching operation to the trajectory to minimize the distance between the second position and the point within the area of uncertainty that is closest to the second position.

5. The method of claim 1, wherein the first position of the mobile device is based on signals received from a satellite positioning system.

6. The method of claim 1, wherein the first position of the mobile device is based on a previous PDR trajectory combined with a previous position of the mobile device.

7. The method of claim 1, further comprising:
   obtaining, at the mobile device, the updated remote transmitter location estimates;
   determining, at the mobile device, a second trajectory based on the PDR measurements between the second time and a third time;
   obtaining, at the mobile device, a group of signal measurements for signals received from the one or more remote transmitters at the third time;
   determining, at the mobile device, a third position of the mobile device based on one or more of the group of signal measurements received at the third time;
   determining, at the mobile device, a second constrained location estimate based on the constrained location estimate position and the second trajectory; and
   determining, at the mobile device, a second positional difference between the third position and the second constrained location estimate.

8. The method of claim 1, wherein obtaining the remote transmitter location estimates comprises:
   obtaining the remote transmitter location estimates from received assistance data including: floorplan data, street map data, global frame data, or local frame data, or any combination thereof.

9. The method of claim 1, further comprising updating, at the mobile device, the remote transmitter location estimates based on the positional difference.

10. A mobile wireless device comprising:
    one or more inertial sensors configured to:
      obtain a group of pedestrian dead-reckoning (PDR) measurements from one or more inertial sensors of the mobile device, the one or more inertial sensors including: a gyroscope, an accelerometer, or a magnetometer, or any combination thereof;
    a transceiver configured to:
      obtain remote transmitter location estimates for one or more remote transmitters, the one or more remote transmitters comprising or one or more terrestrial nodes; and
      obtain a group of signal measurements for signals received from the one or more remote transmitters; and
    one or more processors, coupled to the transceiver and the one or more inertial sensors, configured to:
      determine a first position of the mobile device at a first time;
      determine a trajectory based on the PDR measurements between the first time and a second time;
      determine a second position of the mobile device based on one or more of the group of signal measurements obtained on or about the second time;
      determine a constrained location estimate based on the first position and the trajectory, wherein the constrained location estimate includes an area of uncertainty;

calculate a positional difference between the second position and the constrained location estimate, wherein the position difference is a distance between the second position and a point within the area of uncertainty that is closest to the second position; and determine a current position of the mobile device as the point within the area of uncertainty that is closest to the second position.

11. The mobile wireless device of claim 10, wherein the one or more processors are configured to determine the constrained location estimate by applying a rotation operation to the trajectory to minimize the distance between the second position and the point within the area of uncertainty that is closest to the second position.

12. The mobile wireless device of claim 10, wherein the one or more processors are configured to determine the constrained location estimate by applying a stretching operation to the trajectory to minimize the distance between the second position and the point within the area of uncertainty that is closest to the second position.

13. The mobile wireless device of claim 10, further comprising a receiver for use with a satellite positioning system wherein the one or more processors are configured to determine the first position based on signals received from the satellite positioning system.

14. The mobile wireless device of claim 10, wherein the first position of the mobile device is based on a previous PDR trajectory combined with a previous position of the mobile device.

15. The mobile wireless device of claim 10, wherein the transceiver is configured obtain the updated remote transmitter location estimates and obtain a group of signal measurements for signal received from one or more remote transmitters at a third time, and the one or more processors are further configured to:
  determine a second trajectory based on the PDR measurements between the second time and the third time;
  determine a third position of the mobile device based on one or more of the group of signal measurements received at the third time;
  determine a second constrained location estimate based on the constrained location estimate position and the second trajectory; and
  determine a second positional difference between the third position and the second constrained location estimate.

16. The mobile wireless device of claim 10, wherein the one or more processors are further configured to update the remote transmitter location estimates based on the positional difference, and the transceiver is configured to send the updated remote transmitter location estimates to one or more remote transmitters.

17. The mobile wireless device of claim 10, wherein the transceiver configured to obtain the remote transmitter location estimates is configured to:
  obtain the remote transmitter location estimates from received assistance data including: floorplan data, street map data, global frame data, or local frame data, or any combination thereof.

18. An apparatus to determine location information, the apparatus comprising:
  means for determining, at a mobile device, a first position estimate of the mobile device at a first time;
  means for obtaining, at the mobile device, remote transmitter location estimates for one or more remote transmitters, the one or more remote transmitters comprising one or more terrestrial nodes;
  means for obtaining, at the mobile device, a group of pedestrian dead-reckoning (PDR) measurements from one or more inertial sensors of the mobile device, the one or more inertial sensors including: a gyroscope, an accelerometer, or a magnetometer, or any combination thereof;
  means for determining, at the mobile device, a trajectory based on the PDR measurements between the first time and a second time;
  means for obtaining, at the mobile device, a group of signal measurements for signals received from the one or more remote transmitters at the second time;
  means for determining, at the mobile device, a second position of the mobile device based on one or more of the group of signal measurements received at the second time;
  means for determining a constrained location estimate based on the first position and the trajectory, wherein the constrained location estimate includes an area of uncertainty;
  means for calculating a positional difference between the second position and the constrained location estimate, wherein the position difference is a distance between the second position and a point within the area of uncertainty that is closest to the second position; and
  means for determining a current position of the mobile device as the point within the area of uncertainty that is closest to the second position.

19. The apparatus of claim 18, further comprising:
  means for updating the remote transmitter location estimates based on the positional difference; and
  means for sending the updated remote transmitter location estimates to one or more remote transmitters.

20. A non-transitory computer readable media programmed with instructions, executable on a processor, to:
  determine, at a mobile device, a first position of the mobile device at a first time;
  obtain, at the mobile device, remote transmitter location estimates for one or more remote transmitters, the one or more remote transmitters comprising one or more terrestrial nodes;
  obtain, at the mobile device, a group of pedestrian dead-reckoning (PDR) measurements from one or more inertial sensors of the mobile device, the one or more inertial sensors including: a gyroscope, an accelerometer, or a magnetometer, or any combination thereof;
  determine, at the mobile device, a trajectory based on the PDR measurements between the first time and a second time;
  obtain, at the mobile device, a group of signal measurements for signals received from the one or more remote transmitters at the second time;
  determine, at the mobile device, a second position of the mobile device based on one or more of the group of signal measurements received at the second time;
  determine, at the mobile device, a constrained location estimate based on the first position and the trajectory, wherein the constrained location estimate includes an area of uncertainty;
  calculate, at the mobile device, a positional difference between the second position and the constrained location estimate, wherein the position difference is a distance between the second position and a point within the area of uncertainty that is closest to the second position; and determine a current position of the mobile device as the point within the area of uncertainty that is closest to the second position.

21. The computer readable media of claim 20, further comprising instructions, executable on a processor to:
update, at the mobile device, the remote transmitter location estimates based on the positional difference; and
send the updated remote transmitter location estimates to one or more remote transmitters.

* * * * *